United States Patent
Au

(10) Patent No.: US 11,723,324 B2
(45) Date of Patent: Aug. 15, 2023

(54) HYDROPONIC TRAY

(71) Applicant: AUASIA AGROTECH SDN. BHD., Ipoh (MY)

(72) Inventor: Chen Hsiung Au, Ulu Kinta (MY)

(73) Assignee: Auasia Agrotech Sdn. Bhd., Lahat (MY)

(*) Notice: Subject to any disclaimer, the term of this patent is extended or adjusted under 35 U.S.C. 154(b) by 43 days.

(21) Appl. No.: 16/907,203

(22) Filed: Jun. 20, 2020

(65) Prior Publication Data

US 2021/0000028 A1   Jan. 7, 2021

(30) Foreign Application Priority Data

Jul. 1, 2019   (MY) .......................... PI 2019003809

(51) Int. Cl.
*A01G 31/02* (2006.01)
*A01G 31/00* (2018.01)

(52) U.S. Cl.
CPC ........ *A01G 31/02* (2013.01); *A01G 2031/006* (2013.01)

(58) Field of Classification Search
CPC .. A01G 31/02; A01G 2031/006; A01G 31/00; A01G 31/06; A01K 63/045; F16K 1/20; F16K 1/2014
See application file for complete search history.

(56) References Cited

U.S. PATENT DOCUMENTS

| | | | | | |
|---|---|---|---|---|---|
| 3,525,435 | A | * | 8/1970 | Conner, Jr. | A01K 63/045 210/167.25 |
| 3,992,809 | A | * | 11/1976 | Chew | A01G 31/02 47/62 R |
| 4,584,791 | A | * | 4/1986 | Wolf | A01G 31/02 47/62 C |
| 4,713,173 | A | * | 12/1987 | Goldman | C02F 3/10 210/167.22 |
| 5,062,951 | A | * | 11/1991 | Tominaga | A01K 63/045 210/167.23 |
| 5,266,190 | A | * | 11/1993 | Tominaga | A01K 63/045 119/259 |
| 5,394,647 | A | * | 3/1995 | Blackford, Jr. | A01G 31/02 47/62 A |
| 6,290,844 | B1 | * | 9/2001 | Tennyson, Jr. | A01K 63/045 119/259 |
| 10,076,085 | B2 | * | 9/2018 | Holby | A01G 9/02 |

(Continued)

FOREIGN PATENT DOCUMENTS

| | | | | | |
|---|---|---|---|---|---|
| CN | | 1466643 A | * | 1/2004 | ............ E02B 13/02 |
| KR | 10-2004-0024608 | | * | 10/2004 | |

*Primary Examiner* — Magdalena Topolski
(74) *Attorney, Agent, or Firm* — Preston Smirman; Smirman IP Law, PLLC

(57) ABSTRACT

A hydroponic tray for agricultural use. More particularly, the hydroponic tray allows control on fluid flowing there through. The tray includes an inlet end for the ingress of fluid and an outlet end for the egress of fluid, a trough extending continuously between the inlet end and the outlet end along which, in use, the fluid flows, and at least one fluid regulator device extending transversely across the trough, wherein each fluid regulator device comprises a sluice panel adapted to allow a predetermined rate of fluid flow there through and a control panel moveable relative to the sluice panel to vary the rate of fluid flow through the fluid regulator.

9 Claims, 5 Drawing Sheets

(56) References Cited

U.S. PATENT DOCUMENTS

| | | | |
|---|---|---|---|
| 10,588,296 B1* | 3/2020 | Rimer | A01K 63/045 |
| 2017/0238486 A1* | 8/2017 | De Feo | A01G 9/021 |
| 2018/0139915 A1* | 5/2018 | Au | A01G 31/02 |
| 2019/0327921 A1* | 10/2019 | Nelson | A01G 9/247 |

* cited by examiner

HYDROPONIC TRAY

CROSS-REFERENCE TO RELATED APPLICATION

The instant application claims priority to Malaysia Patent Application Serial No. PI 2019003809 filed Jul. 1, 2019, the entire specification of which is expressly incorporated herein by reference.

FIELD OF THE INVENTION

The present invention relates generally to a hydroponic tray for agriculture use. More particularly, the hydroponic tray comprises a fluid regulator device which allows control on fluid flowing there through.

BACKGROUND OF THE INVENTION

Hydroponics is a method of growing plants without soil by using nutrient solutions in a water solvent. Depending on the type of plants, the nutrient solution can be used in a static condition or flows continuously past the roots of plants. Either way, it is important to be able to adjust the depth of nutrient solution regularly. Hence, a hydroponic tray equipped with a fluid regulating device is desired.

Previously, United States Patent Application Publication No. US 20180139915 disclosed a hydroponic tray capable of adjusting depth of nutrient solution within the tray by means of a paddle assembly. More particularly, the adjustable paddle assembly comes with different heights which corresponds to a predetermined depth of nutrient solution in a compartment. As such, the depth of nutrient solution is limited to the height of the paddle. Improvement is further necessary to achieve more flexible depth as well as flow rate. This invention provides the aforementioned advantages.

SUMMARY OF THE INVENTION

In accordance with a first aspect of the invention, there is provided hydroponic tray for agriculture use. The tray comprises: an inlet end for the ingress of fluid and an outlet end for the egress of fluid; a trough extending continuously between the inlet end and the outlet end along which, in use, the fluid flows; and at least one fluid regulator device extending transversely across the trough, wherein each fluid regulator device comprises a sluice panel adapted to allow a predetermined rate of fluid flow there through and a control panel moveable relative to the sluice panel to vary the rate of fluid flow through the fluid regulator.

In the preferred embodiment, the sluice panel is connected to the control panel via a hinge joint. Preferably, the sluice panel is configured with an undercut. Further, the control panel is configured with one or more grooves and a handle. In the present invention, the width of the undercut is relatively wider than the grooves. Therefore, fluid passing through the trough can be controlled by opening or closing of the control panel in relative to the sluice panel.

In the preferred embodiment, the tray enables simultaneous cultivating of different group of plants with different irrigation requirements within one tray. The fluid regulator device also acts as a divider to compartmentalize the tray. Therefore, a single tray can accommodate a few compartments with different depth of nutrient solution as well as flow rate thereof.

In the preferred embodiment, the tray may further comprised of one or more cultivating pots arranged in a side-by-side manner along the trough. Preferably, the pot has a non-circular top, a substantially circular base bottom and slanted sidewalls connecting between the top and bottom. Further, the sidewalls are preferably configured with one or more vertically-aligned slits.

In the preferred embodiment, the tray may further comprised of one or more filter device located along the trough for collecting particulate matter carried from the inlet to the outlet end. Preferably, the filter device comprises a perforated casing having an open end and two baffles at each side of the open end so as to guide fluid flowing into the casing.

In accordance with a second aspect of the invention, there is provided a kit of parts for assembly to provide a hydroponic tray for horticultural use. The kit comprises: a tray having an inlet end for the ingress of fluid and an outlet end for the egress of fluid; and a trough extending continuously between the inlet end and the outlet end along which, in use, the fluid flows; the kit further comprising at least one fluid regulator device to be fitted in the tray so that it extends transversely across the trough, wherein each fluid regulator device comprises a sluice panel adapted to allow a predetermined rate of fluid flow there through, and a control panel being adjustable in relative to the sluice panel to vary fluid flow, the kit further comprising one or more containers to be disposed in the tray for growing plants therein and a filter device for location in the trough to trap particulate matter carried by the fluid. Each component of the kit can be assembled or dissembled as necessary.

BRIEF DESCRIPTION OF THE DRAWINGS

The invention is illustrated, although not limited, by the following description of embodiments made with reference to the accompanying drawings in which.

DETAILED DESCRIPTION OF THE INVENTION

The present invention is hydroponic tray for horticultural use and/or a kit of parts for assembly to provide the same.

Exemplary, non-limiting embodiments of the invention will be disclosed. However, it is to be understood that limiting the description to the preferred embodiments of the invention is merely to facilitate discussion of the present invention and it is envisioned that those skilled in the art may devise various modifications without departing from the scope of the appended claim.

Figure 1:
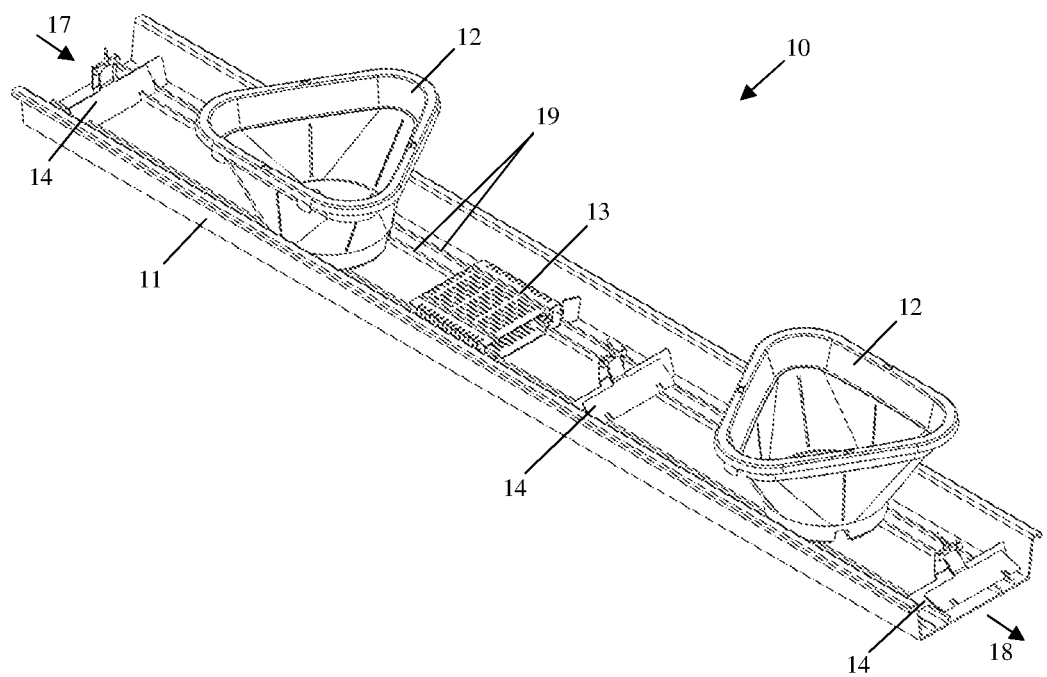
FIG. 1 is a perspective view of the tray according to the present invention.

According to FIG. 1, the hydroponic tray 10 of the invention comprises an inlet end 17 for the ingress of fluid, an outlet end 18 for the egress of fluid, a trough 11 extending continuously between the inlet end 17 and the outlet end 18; and three removable fluid regulator devices (14, 15, 16) mounted transversely across the trough. The base of the trough 11 comprises a plurality of longitudinal ribs 19 complementary to the configurations of the fluid regulator devices (14, 15, 16).

Figure 2:
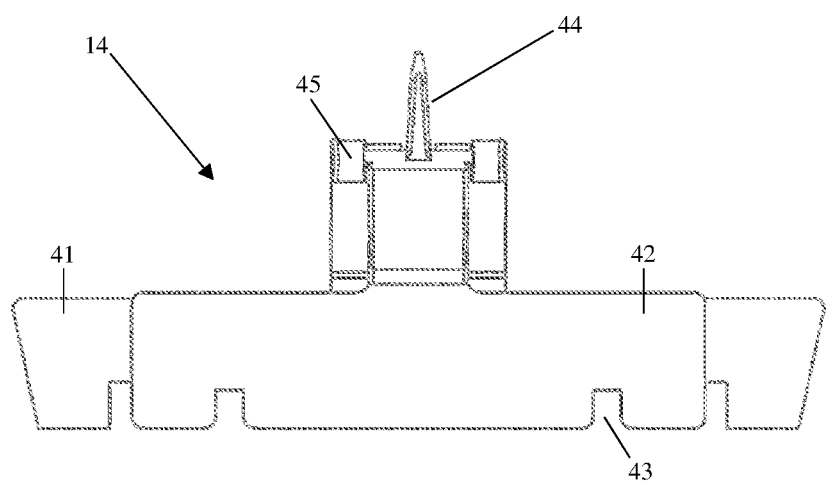
FIG. 2 is a front view of the fluid regulating device disengaged from the tray.
Figure 3:
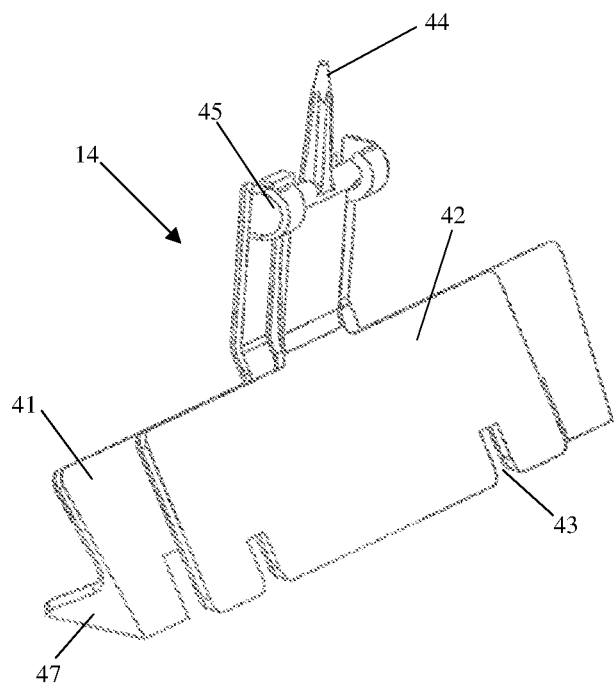
FIG. 3 is a perspective view of the fluid regulating device in a closed condition whereby the control panel rests on the sluice panel.

According to FIGS. 2 and 3, each of the fluid regulator devices (14, 15, 16) comprised of a sluice panel 41 and a control panel 42, in which they are connected with each other via a hinge joint 45. The hinge joint 45 use shall allow a 180 degree turning of the control panel 42 away from the sluice panel 41, but not limited thereto. Alternatively, a 360 degree rotatable hinge joint can be used. More preferably, the hinge joint 45 used can be equipped with stopper or the like so as to temporarily engage the control panel 42 at certain angle in relative to the sluice panel 41.

In the preferred embodiment, the sluice panel 41 comprises a plate 46 adapted with an L shape base 47 and a protruding end 48 configured with components, such as knuckles, of the hinge joint 45. More particularly, the plate 46 has a shape that conforms with sides of the trough. Further, the plate 46 is preferably configured with an undercut 49 having a width complementary to the distance between two longitudinal ribs 19 at the base of the trough 11.

In the preferred embodiment, the control panel 42 comprises another plate 50 and another protruding end 51 configured with components, such as a pin, of the hinge joint 45. More particularly, the plate 50 is rectangular and having a smaller width in relative to the plate 46. Preferably, the plate 50 is preferably configured with one or more grooves 43 having widths complementary to the width of the longitudinal ribs 19, such that the control panel 42 can be fitted into the base of the trough 11. On the other hand, the protruding end 51 is further adapted with a handle 44 extending away from the trough 11.

Figure 4:
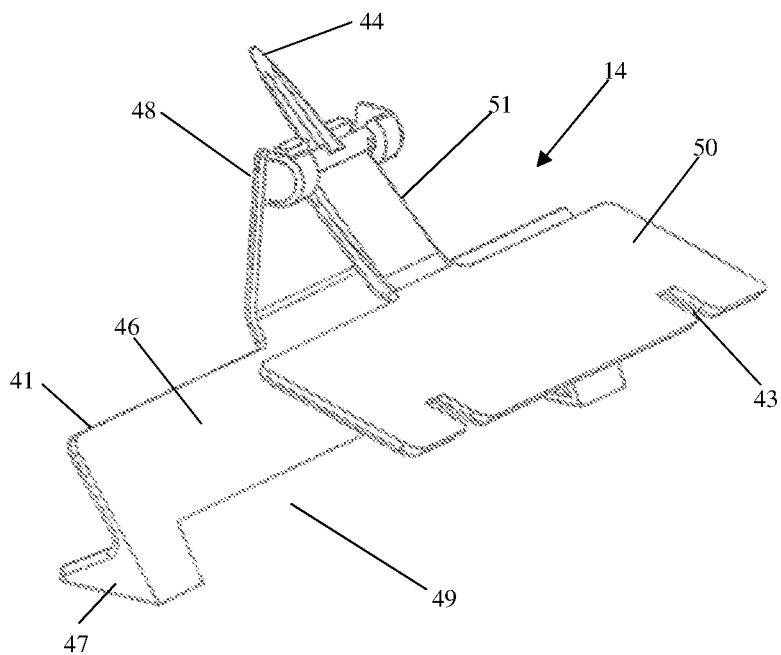
FIG. 4 is a perspective view of the fluid regulating device in an opened condition whereby the control panel is fully lifted away from the sluice panel.
Figure 5:
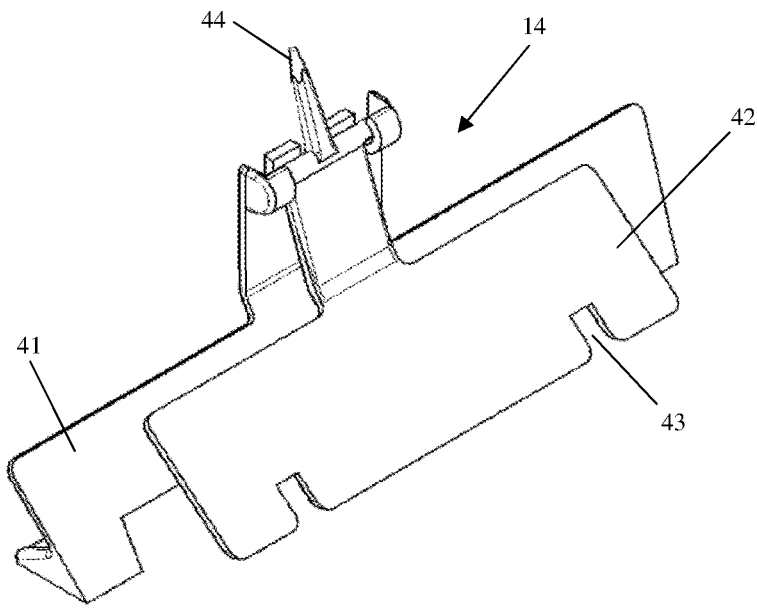
FIG. 5 is a perspective view of the fluid regulating device in a partially opened condition whereby the control panel is partially lifted away from the sluice panel.

In accordance to the preceding description, the fluid regulator devices (14, 15, 16) can be adjusted between positions, as shown in FIGS. 3-5, by manipulating the handle 44. The configurations of each features from the sluice panel 41 and the control panel 42 works in relation to each other to adjust the fluid depth and flow rate thereof. More particularly, the width of the undercut 49 is relatively wider than the rectangular plate 50 of the control panel 42. In this way, as shown in FIGS. 1 and 3, the gaps formed between rectangular plate 46 of the sluice 41 and the rectangular plate 50 of the control panel can accommodate ribs 19 at base of the trough.

It shall be understood that there can be a variety of options in the combination depending on the type of plants and their growth phases. For example, there can be two regulator devices in a single tray, one being in a partially opened condition and another being in a opened condition. Further, it shall be understood that the fluid regulator devices (14, 15, 16) may alter in condition from time to time.

FIG. 1 shows the use of a combination of closed 14, partially opened 15 and opened fluid regulator devices 16 in a single tray. In a closed condition, the fluid regulator device 14 from FIG. 1 and also shown by FIG. 3, the control panel 42 rests on the sluice panel 41. Hence, the fluid flow pathway is substantially blocked as there is no gap between the undercut 49, the grooves 43, the ribs and the trough 19. In a partially opened condition, the fluid regulator device 15 from FIG. 1 and also shown by FIG. 4, the control panel 42 is partially lifted away from the sluice panel 41 thereby partly opening up the undercut 49 and allowing fluid to flow at a controlled rate and volume there through. In an opened condition, the fluid regulator device 16 from FIG. 1 and also shown by FIG. 5 the control panel 42 is fully lifted away from the sluice panel 41 thereby fully opening up the undercut 49 and allowing fluid to flow freely there through. It shall be noted that apart from the aforementioned conditions, the fluid regulator devices can be varies conditions, such as but not limited to, a quarterly opened condition.

Further, it is preferred that the fluid regulator devices (14, 15, 16) shall be positioned in a way such that fluid flows through or blocked by the sluice panel 41 first, followed by the control panel 42. Hence, it shall be understood that in an event that the inlet and the outlet positions are exchanged, the positions of the regulators (14, 15, 16) can be switched accordingly.

In view of the above, the fluid regulator devices (14, 15, 16) may be used as divider in a single tray. For example, FIG. 1 shows a tray having two compartments derived from three regulator devices (14, 15, 16). Different types of plants can be separately cultivated in different compartments. Fluid depth at each compartment can be different and adjusted using the regulator devices as well. Therefore, a single tray can accommodate different groups of plants having different irrigation requirements.

Figure 6:
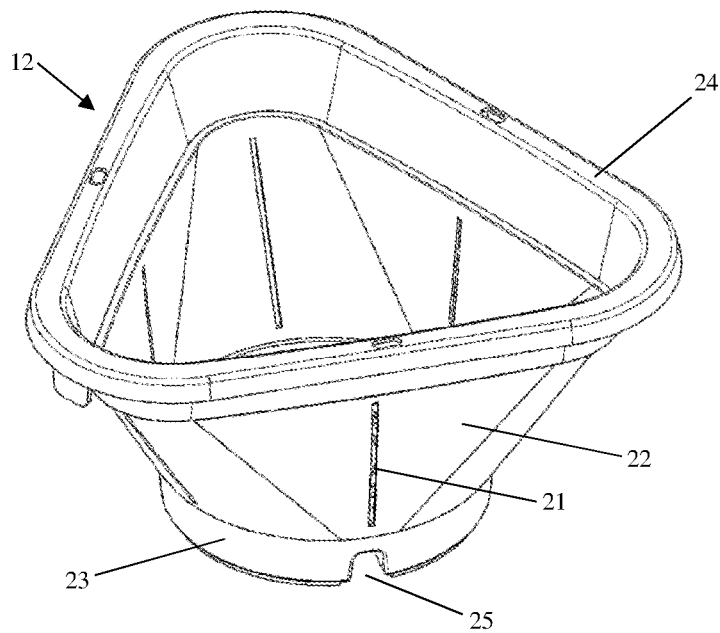
FIG. 6 is a perspective view of the cultivating pot according to the present invention.
Figure 7:
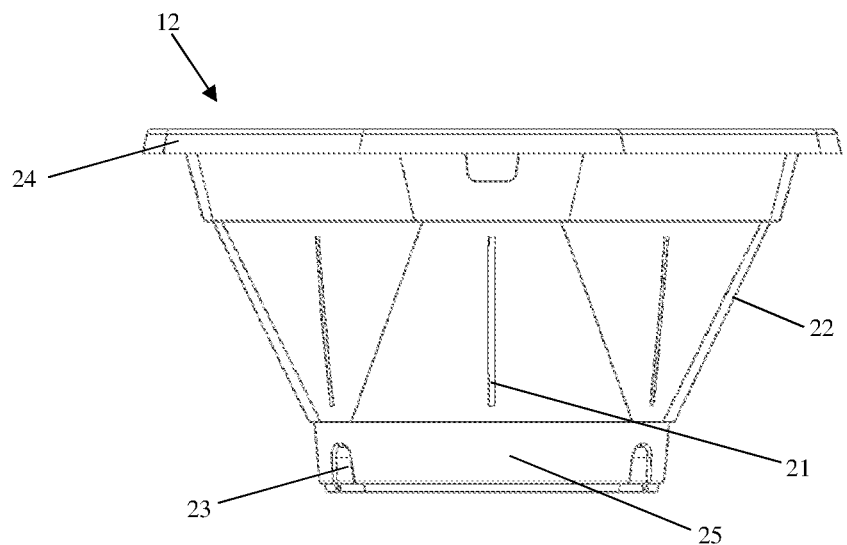
FIG. 7 is a side view of the cultivating pot according to the present invention.

In the present invention, the hydroponic tray 10 of the invention further comprises one or more cultivating pots 12 (e.g., see FIGS. 6 and 7). It is preferred that the cultivating pots used can fully utilise spaces in the trough to enhance productivity thereof. On the other hand, flooding and draining of nutrient solution during plant cultivation results in undesired accumulation of salt in the planting media. Flushing of the accumulated salt during the draining phase is essential to maintain good plant growth. In the present invention, the cultivating pots used are preferably designed to enhance effective flushing off accumulated salt therefrom.

Figure 8:
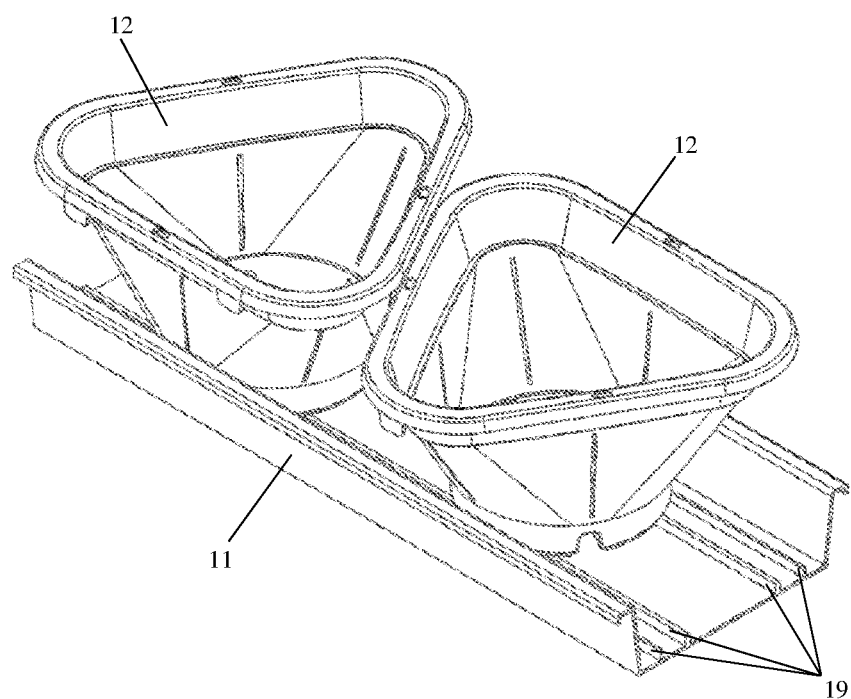
FIG. 8 shows the arrangement of more than one cultivating pots in a tray according to an embodiment of the present invention.

In one preferred embodiment, the pot 12 has a triangular top 24, a substantially circular base bottom 23 and slanted sidewalls 22 connecting between the top and bottom. The preferred triangular top enables the cultivating pots 12 to be arranged in a side-by-side manner along the trough, as seen in FIG. 8. The sidewalls 22 are further configured with one or more vertically-aligned slits 21 to promote fluid flow and allow easy air pruning of plant roots extended therefrom. The slanted sidewalls 22 create an increased fluid pressure at the bottom 23 thereby enhancing the flushing of accumulated salt out of the pot 12. Further, it is preferred that the base bottom 23 has grooves 25 for water to flow out from the pot.

Figure 9:
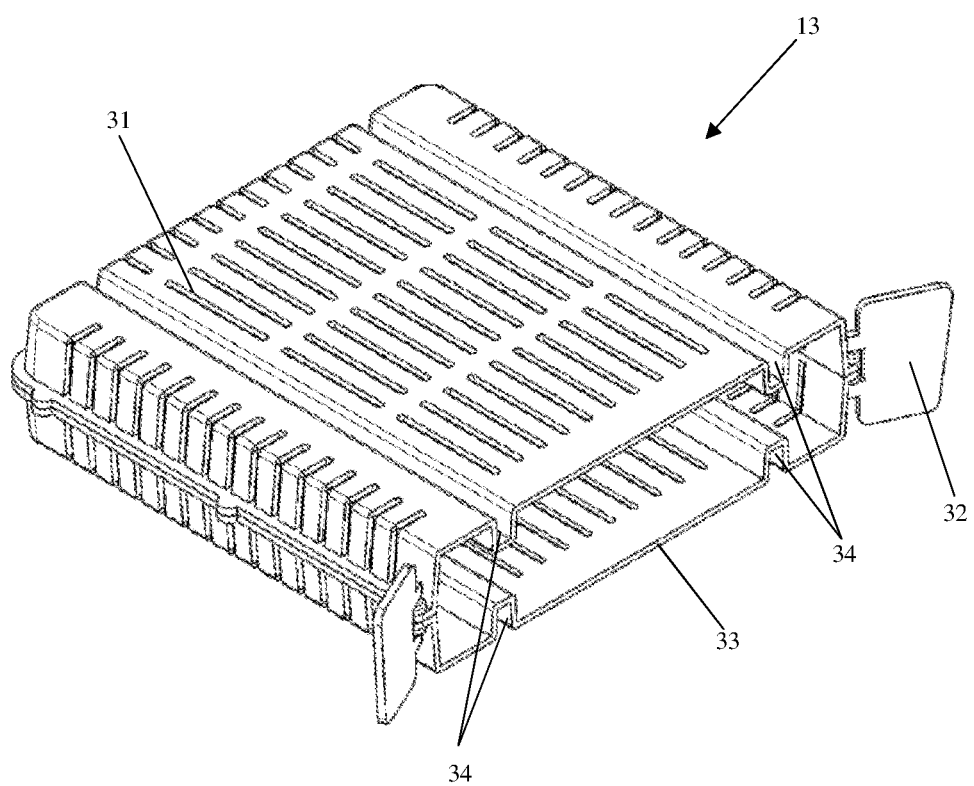
FIG. 9 is a perspective view of the filter device according to the present invention.

In order to avoid blockage of the fluid flow in the tray, especially at any aforementioned parts of the tray, the present invention further comprises one or more filter device 13 (e.g., see FIG. 9) located along the trough 11 for collecting particulate matter carried from the inlet 17 to the outlet end 18. More particularly, the filter device comprises a perforated casing 31 having an open end 33 and two baffles 32 at each side of the open end so as to guide fluid flowing into the casing. It shall be understood that the open end 33 shall be placed facing the direction of fluid flow to allow trapping of undesired matter, such as growing media, loose plant parts, etcetera. More particularly, one or both sides of the perforated casing 31 is configured with indentations 34 to mount on the ribs 19 of the trough. Whenever necessary, the casing 31 can be removed and replaced.

The present invention may be embodied in other specific forms without departing from its essential characteristics. The described embodiments are to be considered in all aspects only as illustrative and not restrictive. The scope of the invention is, therefore indicated by the appended claims rather than by the foregoing description. All changes, which come within the meaning and range of equivalency of the claims, are to be embraced within their scope.

What is claimed is:

1. A hydroponic tray for agricultural use, comprising:
   an inlet end for the ingress of fluid and an outlet end for the egress of fluid;
   a trough extending continuously between the inlet end and the outlet end along which, in use, the fluid flows; and
   at least one fluid regulator device extending transversely across the trough, and comprising a sluice panel integrated with a control panel;
   wherein the control panel is formed with one or more grooves;
   wherein the sluice panel sits along the trough and supports the control panel hinged thereto in an inclined manner as the control panel is manipulated to rotate relative to the sluice panel at an angle to vary a rate of fluid flow after fluid flows through the sluice panel.

2. The hydroponic tray according to claim 1, wherein the sluice panel is formed with an undercut.

3. The hydroponic tray according to claim 2, wherein the width of the undercut is relatively wider than the grooves.

4. The hydroponic tray according to claim 3, further comprising one or more cultivating pots arranged in a side-by-side manner along the trough.

5. The hydroponic tray according to claim 4, wherein the pot has a non-circular top, a substantially circular base bottom and slanted sidewalls connecting between the top and bottom.

6. The hydroponic tray according to claim 5, wherein the sidewalls are formed with one or more vertically-aligned slits.

7. The hydroponic tray according to claim 1, further comprising one or more filter devices located along the trough for collecting particulate matter carried from the inlet end to the outlet end.

8. The hydroponic tray according to claim 7, wherein the filter device comprises a perforated casing having an open end and two baffles at each side of the open end so as to guide fluid flowing into the casing.

9. A kit of parts for assembly to provide a hydroponic tray for agricultural use, comprising:
   a tray having an inlet end for the ingress of fluid and an outlet end for the egress of fluid;
   a trough extending continuously between the inlet end and the outlet end along which, in use, the fluid flows;
   at least one fluid regulator device extending transversely across the trough, and comprising a sluice panel integrated with a control panel;
   one or more containers to be disposed in the tray for growing plants therein; and
   a filter device for location in the trough to trap particulate matter carried by the fluid;
   wherein the control panel is formed with one or more grooves;
   wherein the sluice panel sits along the trough and supports the control panel hinged thereto in an inclined manner as the control panel is manipulated to rotate relative to the sluice panel at an angle to vary a rate of fluid flow after fluid flows through the sluice panel.

* * * * *